(12) United States Patent
Huskamp et al.

(10) Patent No.: US 8,709,330 B2
(45) Date of Patent: Apr. 29, 2014

(54) MANUFACTURING AIRCRAFT PARTS

(75) Inventors: Christopher S. Huskamp, St. Louis, MO (US); Brett Ian Lyons, St. Louis, MO (US)

(73) Assignee: The Boeing Company, Chicago, IL (US)

(*) Notice: Subject to any disclaimer, the term of this patent is extended or adjusted under 35 U.S.C. 154(b) by 1112 days.

(21) Appl. No.: 12/349,204

(22) Filed: Jan. 6, 2009

(65) Prior Publication Data

US 2010/0171241 A1    Jul. 8, 2010

(51) Int. Cl.
*B29C 67/00* (2006.01)

(52) U.S. Cl.
USPC ........................................................ 264/497

(58) Field of Classification Search
CPC .................................................. B29C 67/0077
USPC ........................................................ 264/497
See application file for complete search history.

(56) References Cited

U.S. PATENT DOCUMENTS

| | | | | |
|---|---|---|---|---|
| 5,342,919 | A | * | 8/1994 | Dickens et al. ............... 528/323 |
| 5,817,206 | A | * | 10/1998 | McAlea et al. ............... 264/497 |
| 6,110,411 | A | * | 8/2000 | Clausen et al. ............... 264/497 |
| 2004/0021256 | A1 | | 2/2004 | DeGrange et al. |
| 2005/0278061 | A1 | | 12/2005 | DeGrange et al. |
| 2008/0153947 | A1 | | 6/2008 | Booth et al. |
| 2008/0258330 | A1 | * | 10/2008 | Muller et al. ................. 264/113 |

FOREIGN PATENT DOCUMENTS

| | | |
|---|---|---|
| DE | 10122492 A1 | 11/2002 |
| DE | 102007016656 A1 | 10/2008 |
| DE | 102007024469 A1 | 11/2008 |
| EP | 1676497 A1 | 6/2006 |
| WO | 9729148 A1 | 8/1997 |

OTHER PUBLICATIONS

Singh, RP; Desai, SM; Pathak, G. "Thermal Decomposition Kinetics of Photooxidized Nylon 66". Journal of Applied Polymer Science, vol. 87, pp. 2146-2150, 2003.*
PCT Search report for application PCT/US2009/069411 dated Aug. 23, 2010.

* cited by examiner

*Primary Examiner* — Yogendra Gupta
*Assistant Examiner* — Alison Hindenlang
(74) *Attorney, Agent, or Firm* — Yee & Associates, P.C.

(57) ABSTRACT

A method and apparatus is present for manufacturing parts. A powder material is comprised of a polymer that is semi-crystalline. The powder material has an overlap between a melting temperature range and a crystallization temperature range. The powder material also has a size particular distribution that is substantially a Gaussian distribution, a particle shape that is substantially spherical, and a desired melt flow rate that is less than a temperature at which the powder material begins to chemically break down. The powder material is selected to form a selected powder material. A part is manufactured using an energy delivery system and the selected powder material.

25 Claims, 11 Drawing Sheets

| PARAMETER | WARM-UP | BUILD | COOL-DOWN | PARAMETER TYPE |
|---|---|---|---|---|
| CHAMBER AIRFLOW DAMPER POSITION | 100 | 100 | 100 | BUILD |
| DOWNDRAFT ENABLED | 0 | 0 | 0 | BUILD |
| CUSTOM DOWNDRAFT ENABLED | 0 | 0 | 0 | BUILD |
| LEFT FEED DISTANCE | 0.0110 | 0.0120 | 0.0110 | BUILD |
| LEFT FEED HEATER OUTPUT LIMIT | 60 | 60 | 60-0 | BUILD |
| LEFT FEED HEATER SET POINT | 91-115 | 115 | 115-15 | BUILD |
| LEFT FEED HEATER WAIT FOR TEMP | 1-0 | 0 | 0 | BUILD |
| MINIMUM LAYER TIME | 40-20 | 20 | 10 | BUILD |
| PART CYLINDER HEATER ENABLED | 1 | 1 | 1-0 | BUILD |
| PART CYLINDER HEATER OUTPUT LIMIT | 100 | 100 | 100 | BUILD |
| PART CYLINDER HEATER SET POINT | 190 | 190 | 190-100 | BUILD |
| PART HEATER OUTPUT LIMIT | 35 | 35 | 35-0 | BUILD |
| PART HEATER SET POINT | 200-270 | 270 | 270-35 | BUILD |
| PART HEATER WAIT FOR TEMP | 0 | 0 | 0-1 | BUILD |
| PART HEATER INNER/OUTER RATIO | 1 | 1 | 1 | BUILD |
| PISTON HEATER ENABLE | 0 | 0 | 0 | BUILD |
| PART HEATER OUTPUT LIMIT | 50 | 50 | 50 | BUILD |
| PISTON HEATER SET POINT | 130-180 | 180 | 175-30 | BUILD |
| POWDER LAYER DELAY | 0 | 7 | 0 | BUILD |
| POWDER LAYER THICKNESS | 0.005 | 0.005 | 0.005 | BUILD |
| RIGHT FEED DISTANCE | 0.0110 | 0.0120 | 0.0110 | BUILD |
| RIGHT FEED HEATER OUTPUT LIMIT | 60 | 60 | 60-0 | BUILD |
| RIGHT FEED HEATER SET POINT | 91-115 | 115 | 115-15 | BUILD |
| RIGHT FEED HEATER WAIT FOR TEMP | 1-0 | 0 | 0 | BUILD |
| ROLLER SPEED | 7.0 | 7.0 | 7.0 | BUILD |
| ROTATE SCAN ORDER | 0 | 0 | 0 | BUILD |
| VECTOR BLOOM ELIMINATION | 1 | 1 | 1 | BUILD |
|  |  |  |  |  |
| FILL LASER POWER | N/A | 55.0 | N/A | PART |
| FILL SCAN COUNT | N/A | 1 | N/A | PART |
| FILL BEAM OFFSET X | N/A | 0.0145 | N/A | PART |
| FILL BEAM OFFSET Y | N/A | 0.0150 | N/A | PART |
| OUTLINE LASER POWER | N/A | 10 | N/A | PART |
| OUTLINE SCAN COUNT | N/A | 1 | N/A | PART |
| OUTLINE BEAM OFFSET X | N/A | 0.0135 | N/A | PART |
| OUTLINE BEAM OFFSET Y | N/A | 0.0130 | N/A | PART |
| SLICER FILL SCAN SPACING | N/A | 0.010 | N/A | PART |
| SORTED FILL ENABLE | N/A | 1 | N/A | PART |

| PARAMETER | WARM-UP | BUILD | COOL-DOWN | PARAMETER TYPE |
|---|---|---|---|---|
| CHAMBER AIRFLOW DAMPER POSITION | 100 | 100 | 100 | BUILD |
| DOWNDRAFT ENABLED | 0 | 0 | 0 | BUILD |
| CUSTOM DOWNDRAFT ENABLED | 0 | 0 | 0 | BUILD |
| LEFT FEED DISTANCE | 0.0110 | 0.0120 | 0.0110 | BUILD |
| LEFT FEED HEATER OUTPUT LIMIT | 60 | 60 | 60-0 | BUILD |
| LEFT FEED HEATER SET POINT | 91-119 | 119 | 119-15 | BUILD |
| LEFT FEED HEATER WAIT FOR TEMP | 1-0 | 0 | 0 | BUILD |
| MINIMUM LAYER TIME | 20-10 | 10 | 10 | BUILD |
| PART CYLINDER HEATER ENABLED | 1 | 1 | 1-0 | BUILD |
| PART CYLINDER HEATER OUTPUT LIMIT | 100 | 100 | 100 | BUILD |
| PART CYLINDER HEATER SET POINT | 180-225 | 225 | 225-100 | BUILD |
| PART HEATER OUTPUT LIMIT | 35 | 35 | 35-0 | BUILD |
| PART HEATER SET POINT | 200-262 | 262 | 262-35 | BUILD |
| PART HEATER WAIT FOR TEMP | 0 | 0 | 0-1 | BUILD |
| PART HEATER INNER/OUTER RATIO | 1 | 1 | 1 | BUILD |
| PISTON HEATER ENABLE | 0 | 0 | 0 | BUILD |
| PART HEATER OUTPUT LIMIT | 50 | 50 | 50 | BUILD |
| PISTON HEATER SET POINT | 130-180 | 180 | 175-30 | BUILD |
| POWDER LAYER DELAY | 0 | 7 | 0 | BUILD |
| POWDER LAYER THICKNESS | 0.005 | 0.005 | 0.005 | BUILD |
| RIGHT FEED DISTANCE | 0.0110 | 0.0120 | 0.0110 | BUILD |
| RIGHT FEED HEATER OUTPUT LIMIT | 60 | 60 | 60-0 | BUILD |
| RIGHT FEED HEATER SET POINT | 91-119 | 119 | 119-15 | BUILD |
| RIGHT FEED HEATER WAIT FOR TEMP | 1-0 | 0 | 0 | BUILD |
| ROLLER SPEED | 7.0 | 7.0 | 7.0 | BUILD |
| ROTATE SCAN ORDER | 0 | 0 | 0 | BUILD |
| VECTOR BLOOM ELIMINATION | 1 | 1 | 1 | BUILD |
|  |  |  |  |  |
| FILL LASER POWER | N/A | 28.0 | N/A | PART |
| FILL SCAN COUNT | N/A | 1 | N/A | PART |
| FILL BEAM OFFSET X | N/A | 0.0145 | N/A | PART |
| FILL BEAM OFFSET Y | N/A | 0.0150 | N/A | PART |
| OUTLINE LASER POWER | N/A | 10 | N/A | PART |
| OUTLINE SCAN COUNT | N/A | 1 | N/A | PART |
| OUTLINE BEAM OFFSET X | N/A | 0.0135 | N/A | PART |
| OUTLINE BEAM OFFSET Y | N/A | 0.0130 | N/A | PART |
| SLICER FILL SCAN SPACING | N/A | 0.010 | N/A | PART |
| SORTED FILL ENABLE | N/A | 1 | N/A | PART |

| PARAMETER | WARM-UP | BUILD | COOL-DOWN | PARAMETER TYPE |
|---|---|---|---|---|
| CHAMBER AIRFLOW DAMPER POSITION | 100 | 100 | 100 | BUILD |
| DOWNDRAFT ENABLED | 0 | 0 | 0 | BUILD |
| CUSTOM DOWNDRAFT ENABLED | 0 | 0 | 0 | BUILD |
| LEFT FEED DISTANCE | 0.0110 | 0.0120 | 0.0110 | BUILD |
| LEFT FEED HEATER OUTPUT LIMIT | 60 | 60 | 60-0 | BUILD |
| LEFT FEED HEATER SET POINT | 91-119 | 119 | 119-15 | BUILD |
| LEFT FEED HEATER WAIT FOR TEMP | 1-0 | 0 | 0 | BUILD |
| MINIMUM LAYER TIME | 20-10 | 10 | 10 | BUILD |
| PART CYLINDER HEATER ENABLED | 1 | 1 | 1-0 | BUILD |
| PART CYLINDER HEATER OUTPUT LIMIT | 100 | 100 | 100 | BUILD |
| PART CYLINDER HEATER SET POINT | 180-225 | 225 | 225-100 | BUILD |
| PART HEATER OUTPUT LIMIT | 35 | 35 | 35-0 | BUILD |
| PART HEATER SET POINT | 200-262 | 262 | 262-35 | BUILD |
| PART HEATER WAIT FOR TEMP | 0 | 0 | 0-1 | BUILD |
| PART HEATER INNER/OUTER RATIO | 1 | 1 | 1 | BUILD |
| PISTON HEATER ENABLE | 0 | 0 | 0 | BUILD |
| PART HEATER OUTPUT LIMIT | 50 | 50 | 50 | BUILD |
| PISTON HEATER SET POINT | 130-180 | 180 | 175-30 | BUILD |
| POWDER LAYER DELAY | 0 | 7 | 0 | BUILD |
| POWDER LAYER THICKNESS | 0.005 | 0.005 | 0.005 | BUILD |
| RIGHT FEED DISTANCE | 0.0110 | 0.0120 | 0.0110 | BUILD |
| RIGHT FEED HEATER OUTPUT LIMIT | 60 | 60 | 60-0 | BUILD |
| RIGHT FEED HEATER SET POINT | 91-119 | 119 | 119-15 | BUILD |
| RIGHT FEED HEATER WAIT FOR TEMP | 1-0 | 0 | 0 | BUILD |
| ROLLER SPEED | 7.0 | 7.0 | 7.0 | BUILD |
| ROTATE SCAN ORDER | 0 | 0 | 0 | BUILD |
| VECTOR BLOOM ELIMINATION | 1 | 1 | 1 | BUILD |
|  |  |  |  |  |
| FILL LASER POWER | N/A | 28.0 | N/A | PART |
| FILL SCAN COUNT | N/A | 1 | N/A | PART |
| FILL BEAM OFFSET X | N/A | 0.0145 | N/A | PART |
| FILL BEAM OFFSET Y | N/A | 0.0150 | N/A | PART |
| OUTLINE LASER POWER | N/A | 10 | N/A | PART |
| OUTLINE SCAN COUNT | N/A | 1 | N/A | PART |
| OUTLINE BEAM OFFSET X | N/A | 0.0135 | N/A | PART |
| OUTLINE BEAM OFFSET Y | N/A | 0.0130 | N/A | PART |
| SLICER FILL SCAN SPACING | N/A | 0.010 | N/A | PART |
| SORTED FILL ENABLE | N/A | 1 | N/A | PART |

| | MATERIAL | ULTIMATE TENSILE STRENGTH (psi) | 0.2% OFFSET YIELD STRENGTH (psi) | % ELONGATION | MELT POINT (°C) |
|---|---|---|---|---|---|
| 1102 | PEKK | 10100 | 9700 | 1.9 | 310 |
| 1104 | PPS | 5200 | 5125 | 1.5 | 280 |
| 1106 | NYLON 66 | 10200 | 7500 | 4 | 254 |
| 1108 | NYLON 12 | 6600 | 2800 | 16 | 187 |
| 1110 | NYLON 11 | 7000 | 3050 | 22 | 186 |
*FIG. 11*
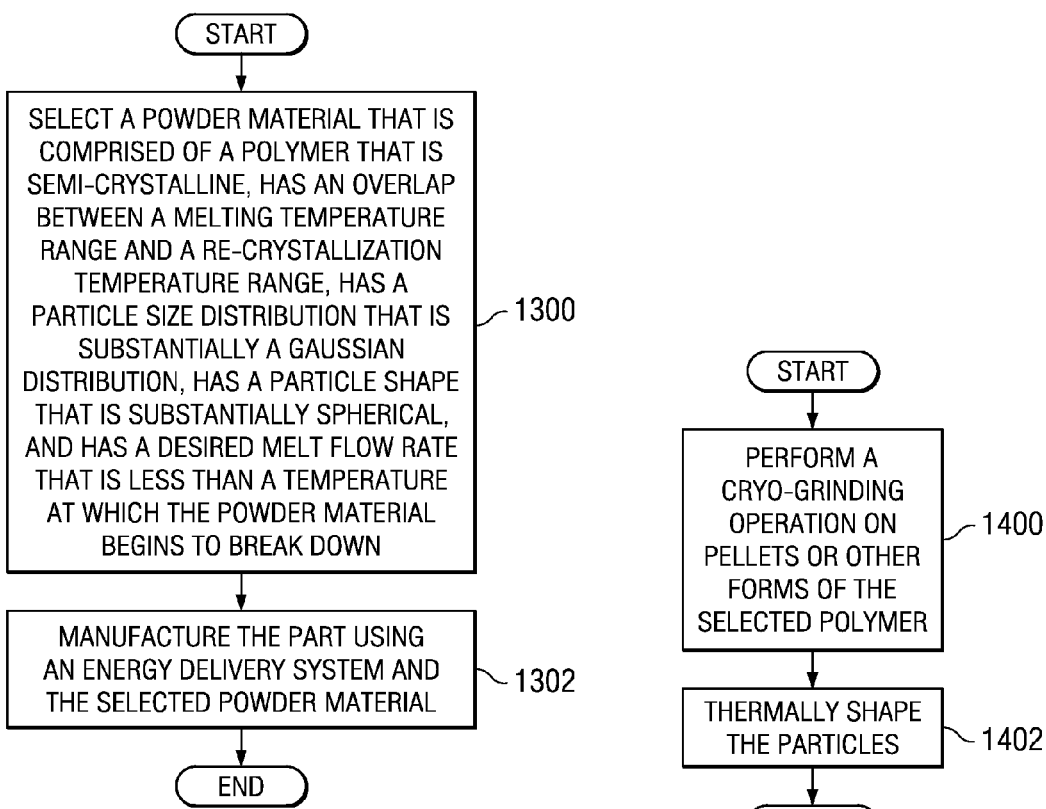
*FIG. 13*
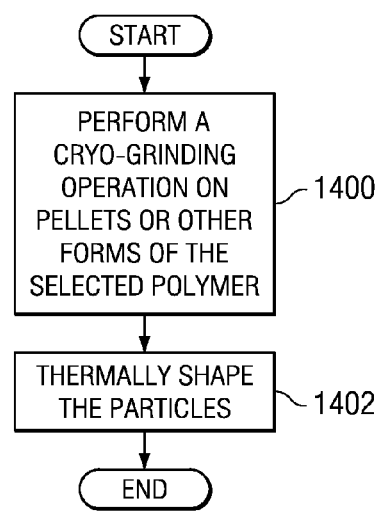
*FIG. 14*

MANUFACTURING AIRCRAFT PARTS

BACKGROUND INFORMATION

1. Field

The present disclosure relates generally to manufacturing parts and, in particular, to manufacturing parts using selective laser sintering.

2. Background

Selective laser sintering is a manufacturing technique that fuses diffused particles into a three-dimensional object using a laser. A laser may selectively fuse small particles in the form of a powdered material by scanning cross sections on the surface of a bed of powder. These cross sections may be identified from a three-dimensional model of the part. As each cross section is scanned, the bed of powder may be lowered by a one layer thickness, and a new layer of powder may be applied on top of the scanned layer. This process may be repeated until the part is completed.

As compared to other manufacturing methods, selective laser sintering can be used to manufacture parts from a relatively wide range of materials. These materials include, for example, polymers, metals, and sand. The process may include full melting, partial melting, or liquid phase sintering.

Selective laser sintering may be used to build prototypes and production parts for use, such as in an aircraft. Selective laser sintering is capable of being used to produce parts with complex geometries within various dimensions.

Aircraft parts typically have stringent and/or extreme design requirements as compared to parts with other applications. These requirements may occur from operating environments that may have high loads and temperatures. Further, these parts also may be required to be capable of withstanding impact loads from maintenance, handling, and/or other types of impact loads. For example, some parts may need to survive usage in some airframe locations that have in-service temperature ranges from around −54 degrees Celsius to around 225 degrees Celsius.

In particular, parts that exist near areas that are heated to or near engine or exhaust temperatures may need to be serviced and handled on the ground in severe winter conditions that may be present above 48 degrees north latitude or at altitude. These conditions require the material that the parts are made of to have sufficient impact resistance at the low end of the temperature range. Simultaneously, sufficient stiffness and mechanical strength must be maintained at the high end of the temperature range to prevent failure in service.

Therefore, it would be advantageous to have a method and apparatus that takes into account one or more of the different issues described above as well as possibly other issues.

SUMMARY

In one advantageous embodiment, a method is present for manufacturing parts. A powder material is selected. The powder material is comprised of a polymer that is a semi-crystalline. The powder material has an overlap between a melting temperature range and a crystallization temperature range. The powder material also has a size particular distribution that is substantially a Gaussian distribution, a particle shape that is substantially spherical, and a desired melt flow rate that is available at less than a temperature at which the powder material begins to chemically break down. A part is manufactured using an energy delivery system and the selected powder material.

In another advantageous embodiment, a method for manufacturing parts is present. A powder material is comprised of a polymer that is semi-crystalline. The powder material is capable of entering a liquid state and a crystalline state within an overlapping range of temperatures. The powder material has a particle size distribution capable of allowing particles to flow through openings formed by larger particles in the particle size distribution. The powder material also has a particle shape that is substantially spherical and a desired melt flow rate that occurs at a temperature below a temperature at which the powder material begins to break down. The powder material is selected to form a selected powder material. The part is manufactured using the selected powder material and an energy delivery system.

In yet another advantageous embodiment, an apparatus has a powder material and a laser sintering machine capable of manufacturing a part using the powder material. The powder material is comprised of a polymer that is a semi-crystalline. The powder material has an overlap between a melting temperature range and a crystallization temperature range. The powder material has a size particle distribution that is substantially a Gaussian distribution, a particle shape that is substantially spherical, and a desired melt flow rate that is less than a temperature at which the powder material begins to break down.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 8 is a diagram illustrating a table of parameters for a laser sintering machine in accordance with an advantageous embodiment;

FIG. 9 is a diagram of a table of parameters for setting a selective sintering machine in accordance with an advantageous embodiment;

FIG. 10 is a table illustrating parameters for setting a selective laser sintering system in accordance with an advantageous embodiment;

FIG. 11 is a table illustrating an illustration of mechanical properties for polymers that may be used in accordance with an advantageous embodiment;

FIG. 13 is a flowchart of a process for manufacturing parts in accordance with an advantageous embodiment;

FIG. 14 is a flowchart of a process for processing a polymer for use as a powder material in accordance with an advantageous embodiment.

DETAILED DESCRIPTION

Figure 1:
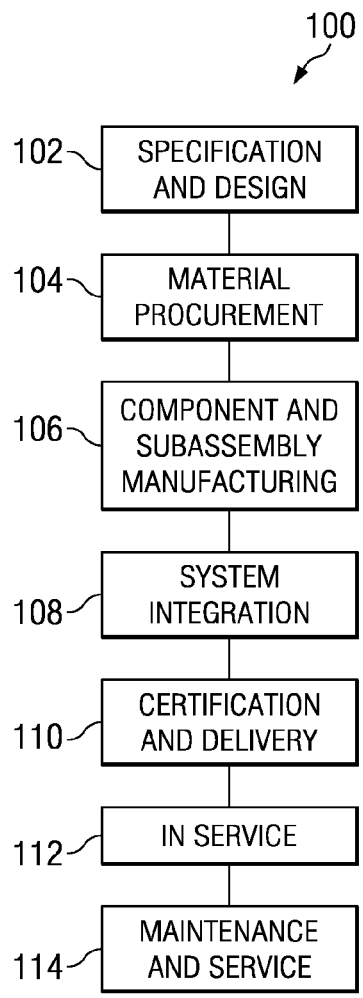
FIG. 1 is a diagram illustrating an aircraft manufacturing and service method in accordance with an advantageous embodiment.
Figure 2:
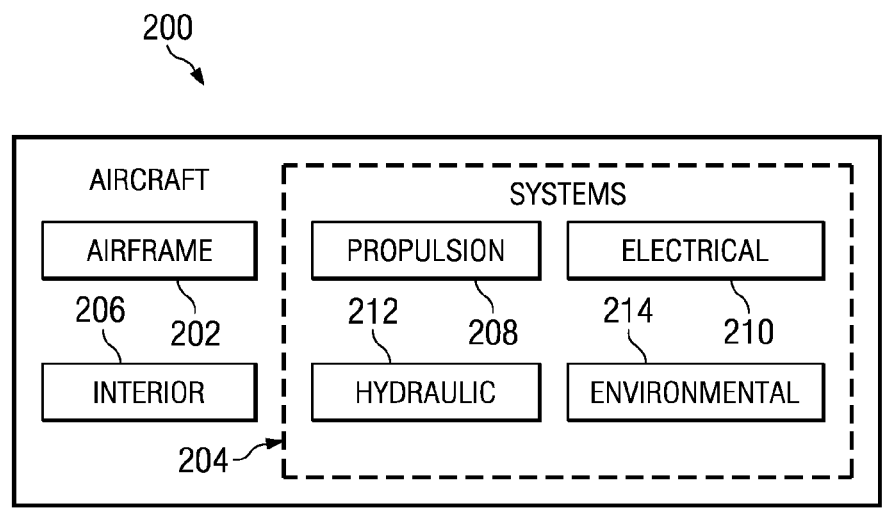
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments provide a method for manufacturing parts. The method may include selecting a powder material that is comprised of a polymer that is a semi-crystalline polymer, has an overlap between a melting temperature range and a crystallization temperature range, has a particle size distribution that is substantially a Gaussian distribution, has a particle shape that is substantially spherical, and has a desired melt flow rate that is less than a temperature at which the powder material begins to chemically break down. The part is manufactured using an energy delivery system and the selected powder material.

The different advantageous embodiments also provide a method for manufacturing parts in which a powder material that is semi-crystalline is selected. The powder material is capable of entering a liquid state and a crystalline state within an overlapping range of temperatures. The powder material has a particle size distribution capable of allowing particles to flow through openings formed by larger particles in the particle size distribution. The powder material also has a particle shape that is substantially spherical and a desired melt flow rate that occurs at a temperature below a temperature at which the powder material begins to chemically break down.

Figure 3:
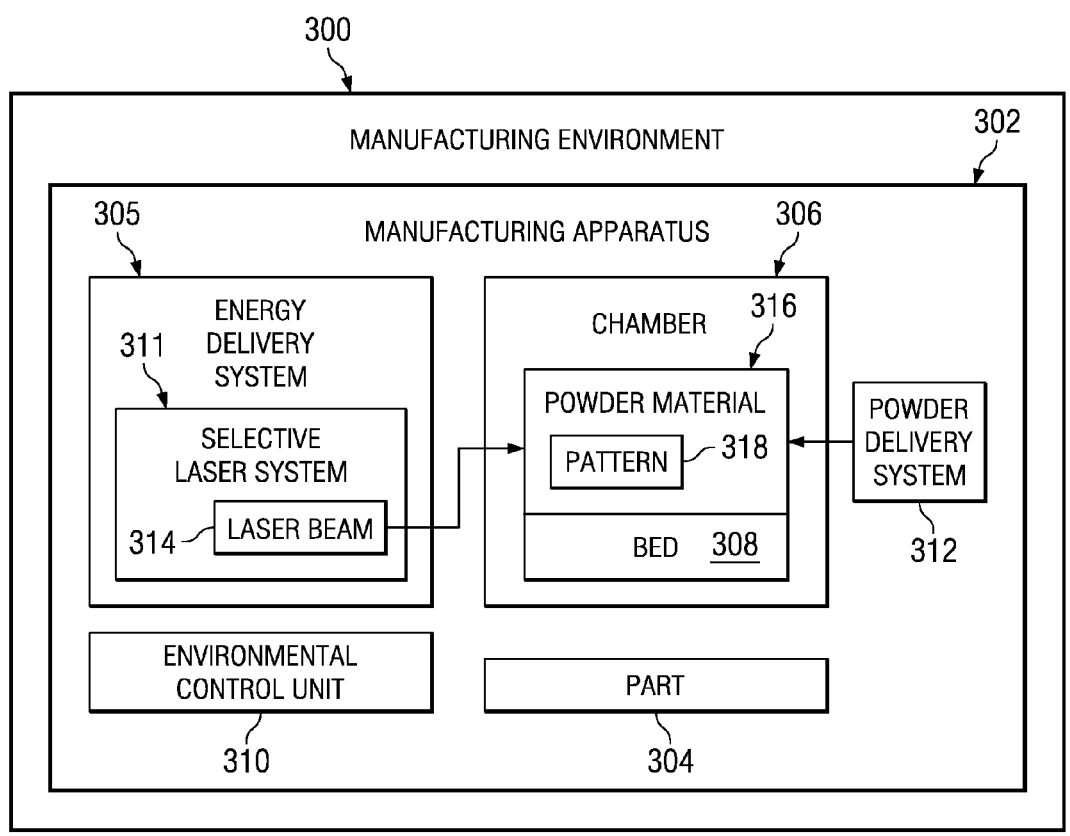
FIG. 3 is a diagram of a manufacturing environment in accordance with an advantageous embodiment.

With reference now to FIG. 3, a diagram of a manufacturing environment is depicted in accordance with an advantageous embodiment. In this example, manufacturing environment 300 may be used to manufacture parts for aircraft 200 in FIG. 2. As illustrated, manufacturing environment 300 contains manufacturing apparatus 302. Manufacturing apparatus 302 may be used to manufacture part 304.

Manufacturing apparatus 302 may include energy delivery system 305, chamber 306, bed 308, environmental control unit 310, and powder delivery system 312. In these examples, energy delivery system 305 may take the form of selective laser system 311. Selective laser system 311 may be implemented using any device capable of generating laser beam 314 and directing laser beam 314.

Powder delivery system 312 deposits powder material 316 onto bed 308. Selective laser system 311 may direct laser beam 314 onto powder material 316 on bed 308. Laser beam 314 may melt and/or sinter powder material 316 in pattern 318 in a manner to form a portion of part 304.

Bed 308 may lower and another layer of powder material 316 may be deposited onto bed 308. Selective laser system 311 may then direct laser beam 314 onto powder material 316 on bed 308 to form another portion of part 304. In these different advantageous embodiments, environmental control unit 310 may control the temperature within chamber 306 and on bed 308. Further, environmental control unit 310 also may maintain a level of oxygen in chamber 306 within some selected amount. The level of oxygen in chamber 306 may be maintained within the selected amount by introducing a gas at a controlled temperature. This gas may be, for example, an inert gas.

For example, environmental control unit 310 may maintain a level of oxygen that is less than around one percent with the input gas temperature at the bed temperature plus 2 degrees Celsius. Environmental control unit 310 may introduce an inert gas, such as nitrogen, into chamber 306.

In the different advantageous embodiments, powder material 316 may be selected as a material suitable for aircraft parts. The different advantageous embodiments recognize that currently used materials for constructing parts using directed energy systems such as a selective laser sintering system may produce parts using materials having melting points that are lower than may be desired. For example, the different advantageous embodiments recognize and take into account that many currently used materials may have a melting point of around 180 to 190 degrees Celsius. In many cases, parts are desired that may be capable of withstanding temperatures of around 250 degrees Celsius and above.

The different advantageous embodiments also recognize and take into account that although many plastic materials may meet the temperature range needed for performance, these materials may be unsuitable for manufacturing parts. The different advantageous embodiments recognize and take into account that many of these plastic materials currently cannot be used with energy delivery systems, such as selective laser sintering systems. These materials may require molds, which have higher costs and lead times.

With currently available selective laser sintering systems, mechanical parts may be made. These mechanical parts, however, may not have the desired mechanical properties at operating temperatures in which the parts may be used. For example, with selective laser sintering, the different advantageous embodiments recognize and take into account that parts may be made with mechanical properties that are suitable for temperatures around 75 degrees Celsius or less. These parts typically become soft and/or lose mechanical properties at around 100 degrees Celsius.

The different advantageous embodiments also recognize and take into account that aluminum may be used to create parts using currently available manufacturing processes. This material provides suitable properties at temperatures of around room temperature to around 120 degrees Celsius. The different advantageous embodiments, however, recognize and take into account that using aluminum increases the weight of the parts.

Thus, the different advantageous embodiments recognize and take into account that it would be desirable to have a polymer that can be used at higher temperatures than currently available materials without a weight penalty of a metal.

In these examples, manufacturing apparatus 302 may take the form of a sintering laser system machine available from 3D Systems, Inc. For example, a Sinter Station® 2500CI system may be used to implement manufacturing apparatus 302. This system may be modified to provide the operating environment needed to process powder material 316. For example, the machine may be modified to run at temperatures of around 330 degrees Celsius or greater. This temperature may be a temperature maintained on the surface of bed 308. These modifications may include ensuring seals, lubricants, and hardware are capable of operating at these temperatures. Further, the machine may be modified to provide an environment that is around one percent or less in oxygen content throughout the range of temperatures.

These modifications may include adding or using a multi-zone heater capable of operating at the desired temperatures. Further, the heating system is capable of reducing thermal gradients. These thermal gradients may be reduced to less than around 10 degrees Celsius within one inch of where a part is to be built. The reduced temperature gradient is to avoid an area in which a material does not properly liquefy, melt, and/or sinter, which may result in low mechanical properties and distortion of parts.

If the gradient results in a high-temperature area in which the temperature change is greater than desired, particles may fuse together generating a porous and hard cake from the powder material. Parts made in this type of condition may have powder material adhere to the parts making those parts dimensionally incorrect and possibly having low strength for a measured cross section.

In maintaining an oxygen level of less than one percent in these examples, nitrogen gas may be pumped into the chamber. Heating of the nitrogen gas also may be necessary to avoid degrading the energy supplied from the laser unit. Of course, any laser sintering system machine capable of processing powder material 316 may be used in addition to the example provided.

Figure 4:
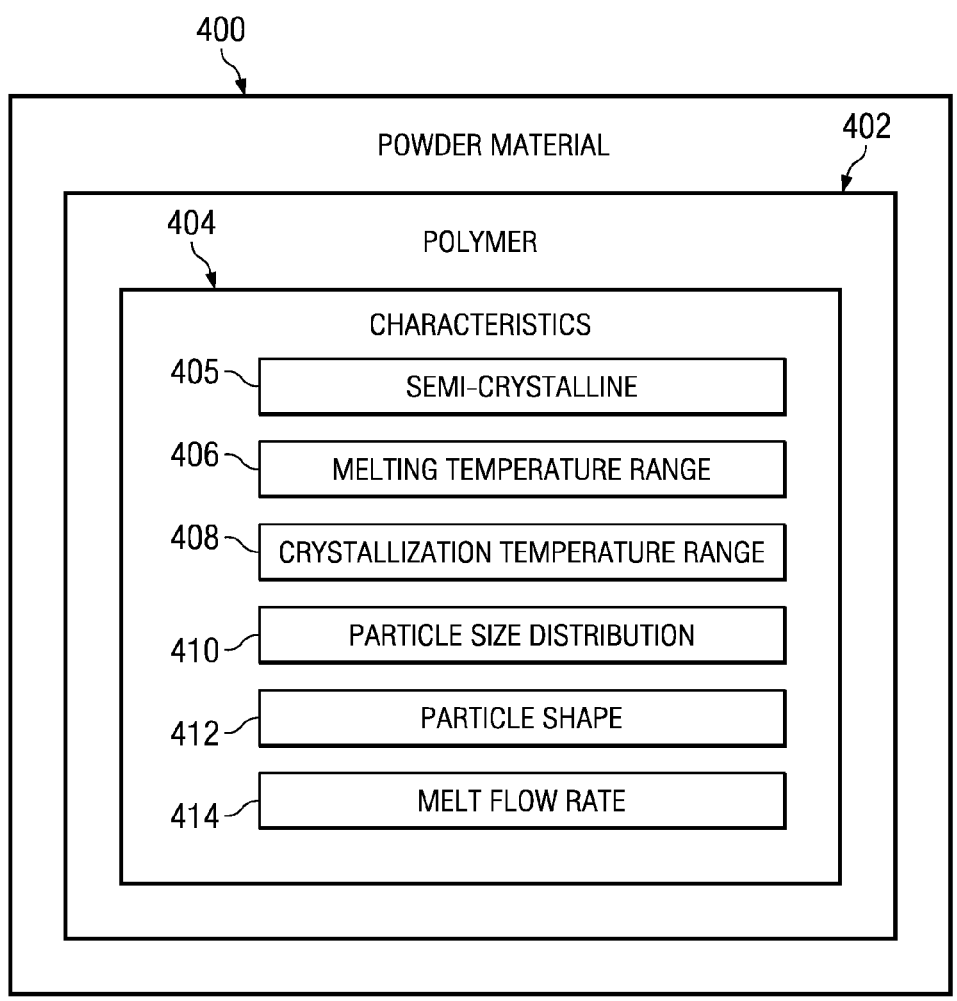
FIG. 4 is a block diagram illustrating characteristics for a powder material for use in manufacturing parts in accordance with an advantageous embodiment.

With reference now to FIG. 4, a block diagram illustrating characteristics for a powder material for use in manufacturing parts is depicted in accordance with an advantageous embodiment. In this example, powder material 400 is an example of a powder material that may be used to implement powder material 316 in FIG. 3 to manufacture part 304.

Powder material 400 comprises polymer 402. Polymer 402 may have characteristics 404. These characteristics may include, for example, without limitation, semi-crystalline 405, melting temperature range 406, crystallization temperature range 408, particle size distribution 410, particle shape 412, and melt flow rate 414. For example, polymer 402 has melting temperature range 406 and crystallization temperature range 408 that overlap.

In some advantageous embodiments, the overlap between melting temperature range 406 and crystallization temperature range 408 may be analyzed on differential scanning calorimetery curves. The overlap between these two ranges of temperatures may be such that the amount of heat absorbed increases when powder material 400 melts and becomes a liquid such that when powder material 400 cools and turns back into a crystallized form, an increase in heat occurs. In the different advantageous embodiments, it may be desirable to have an overlap at these increases in heat absorption and heat release at the different temperatures.

Figure 5:
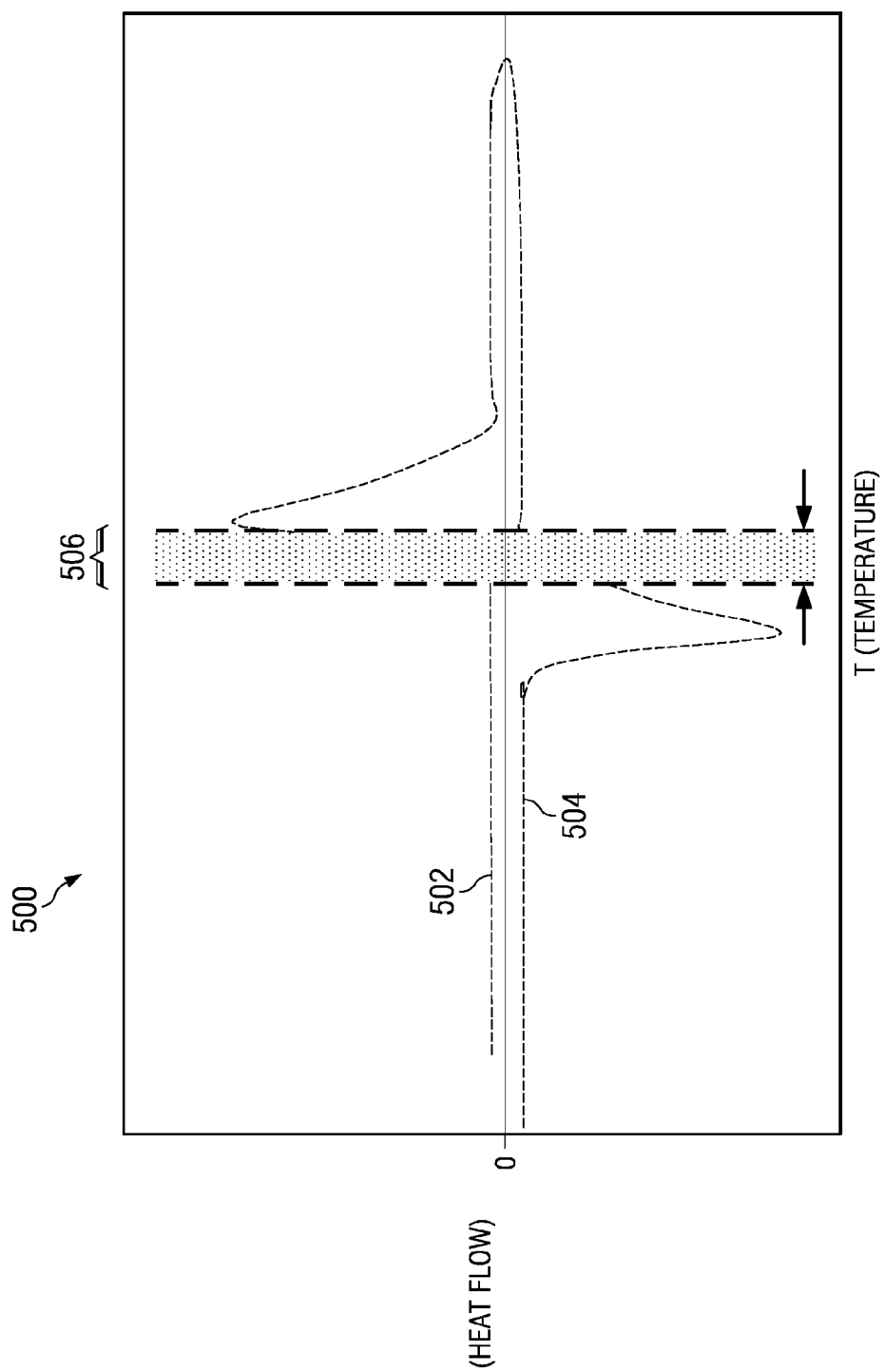
FIG. 5 is a diagram illustrating differential scanning calorimetry curves in accordance with an advantageous embodiment.

With reference to FIG. 5, a diagram illustrating differential scanning calorimetry curves is depicted in accordance with an advantageous embodiment. In graph 500, the x-axis represents temperature, while the y-axis represents heat flow. Curve 502 illustrates endothermic heat flow, while curve 504 illustrates exothermic heat curve. Curve 502 represents the heat flow for melting powder material 400 in FIG. 4, while curve 504 illustrates heat flow for re-crystallizing powder material 400 in FIG. 4. As can be seen, an overlap is present in section 506 in which powder material 400 in FIG. 4 may exist both in a powdered form and a melted form at the same temperature.

Turning back to FIG. 4, particle size distribution 410, in these examples, may be selected to increase the flow of particles. It may be desirable to allow particles to flow or move through openings created by larger particles that may be packed or stacked against each other. Further, it may be desirable to have a particle size distribution that allows for particles to flow more easily when deposited on a bed. The increased flow of particles may be desirable to obtain a more substantially smooth surface for energy delivery.

In the different advantageous embodiments, a particle size distribution of around 20 micrometers to around 130 micrometers may be used with an average particle size between around 50 micrometers and around 80 micrometers.

Particle shape 412 may be a near round and/or spherical shape. In the different advantageous embodiments, the material may be placed into a spherical shape through heat. A spherical shape may be desirable to provide better propagation of the material when powder material 400 is pushed onto a bed from a source or storage container for powder material 400. With particles that are substantially spherical, depositing particles may allow particles to settle into openings and fill voids rather than clump or cause more uneven surfaces.

Melt flow rate 414 for polymer 402 may be selected as a melt flow rate that may occur at a temperature below the temperature at which polymer 402 begins to break down. In these examples, the melt flow rate may be selected as one in which the powder material when melting and/or in liquid form may flow but does not bead up. The flow may be in a sheet-like manner. The beading may not occur by selecting a powder material that flows with a viscosity and height and surface tension that avoids beading. This type of flow may be referred to as veining. The temperature may be such that damage or a breakdown in polymer 402 does not occur at the desired melt flow rate.

Melt flow rate 414 may be selected as one in which any gas generated and/or atmospheric gas that may be present within polymer 402 during melting may exit polymer 402, while polymer 402 is in liquid form. Melt flow rate 414 also may be selected to avoid balling up to avoid clumping when manufacturing the part. In the different advantageous embodiments, a melt flow rate of around 15 grams/10 minutes to around 40 grams/10 minutes at a temperature lower than the temperature at which the polymer begins to break down may be selected for melt flow rate 414.

Figure 6:
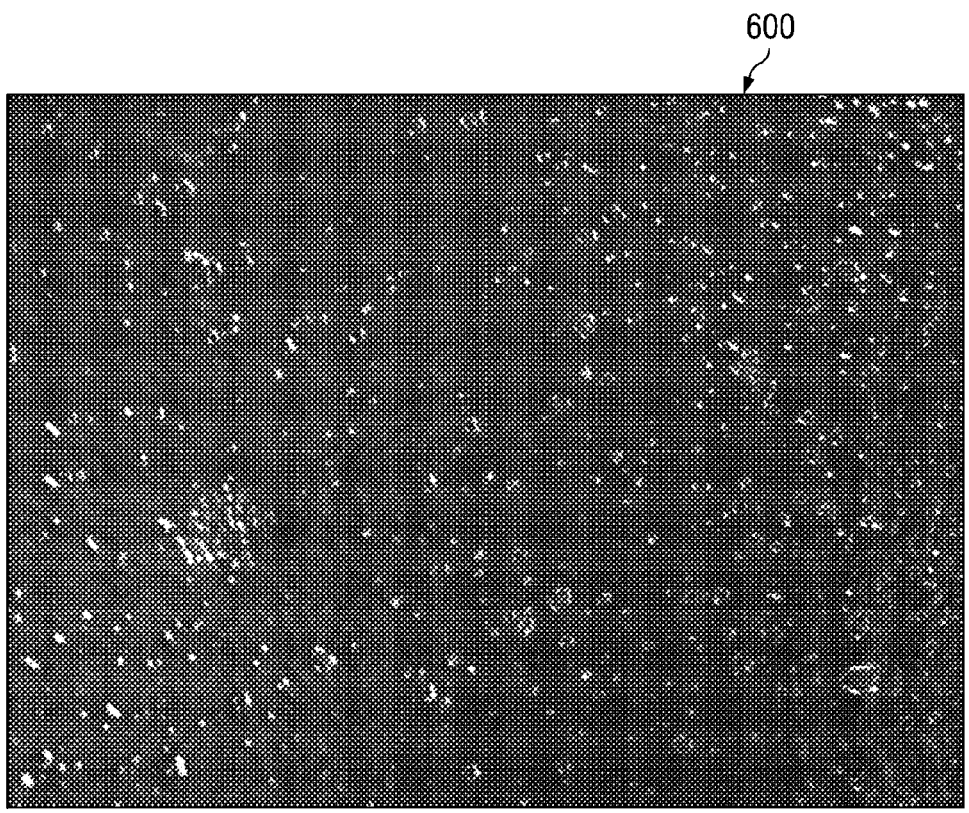
FIG. 6 is a diagram illustrating desirable melt flow in accordance with an advantageous embodiment.

Turning now to FIG. 6, a diagram illustrating desirable melt flow is depicted in accordance with an advantageous embodiment. As can be seen in this example, material 600 has a desirable melt flow in which material 600 is in a liquid form but does not form beads.

Figure 7:
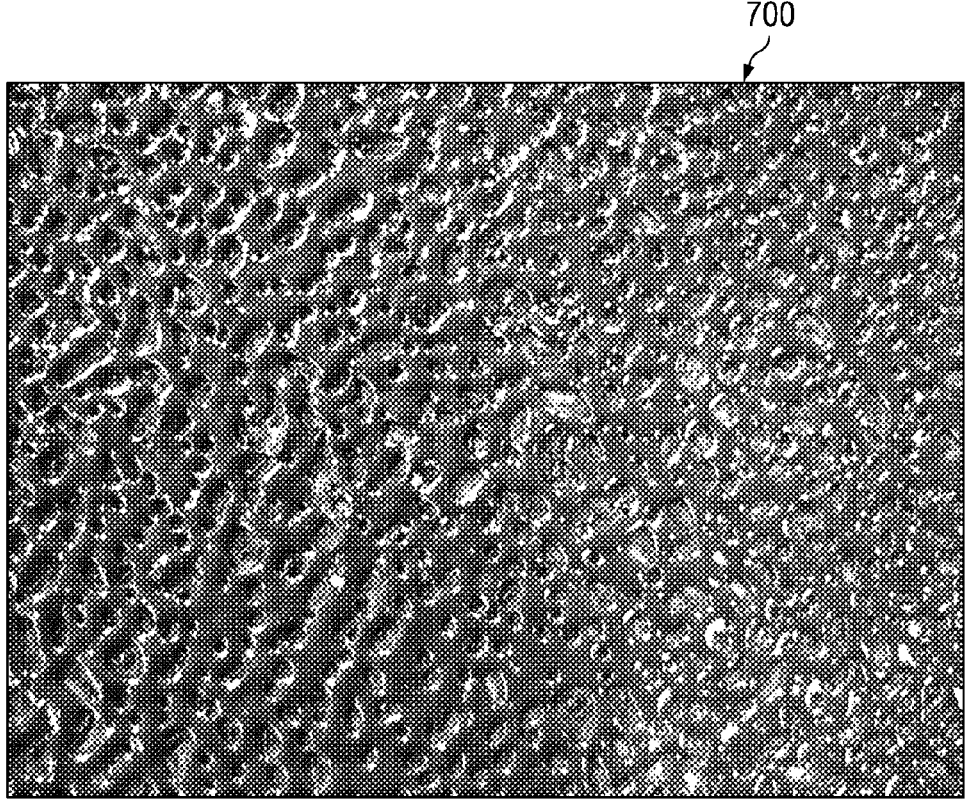
FIG. 7 is a diagram illustrating an undesirable melt flow in accordance with an advantageous embodiment.

In FIG. 7, a diagram illustrating an undesirable melt flow is depicted in accordance with an advantageous embodiment. In this example, material 700 has an undesirable melt flow in which material 600 in FIG. 6 is in a liquid form in which beading occurs.

Examples of powder materials that may be used include, for example, without limitation, nylon 66, polyphenylene sulfide, polyetherketoneketone, a nylon 66 blend, a polyphenylene sulfide blend, a polyetherketoneketone blend, and other suitable materials. Blends of the selected polymers may include blending the polymers with other powder materials. These powder materials may include, for example, without limitation, at least one of glass beads, hollow glass spheres, glass fibers, carbon fibers, other polymers, minerals, clays, flame-retardant additives, color additives, and/or other suitable materials.

As used herein, the phrase "at least one of", when used with a list of items, means that different combinations of one or more of the items may be used, and only one of each item in the list may be needed. For example, "at least one of item A, item B, and item C" may include, without limitation, item A or item A and item B. This example also may include item A, item B, and item C or item B and item C.

In the different advantageous embodiments, these materials may be selected to have characteristics such as, for example, powder material 400 in FIG. 4 with a desired melting temperature range 406. In these examples, melting temperature range 406 may be desired to be around 230 degrees Celsius and above. Of course, other melting temperature ranges may be used, depending on the particular implementation.

With reference now to FIG. 8, a diagram illustrating a table of parameters for a laser sintering machine is depicted in accordance with an advantageous embodiment. In this example, table 800 provides an example of parameters that may be used to produce parts using nylon 66 as a powder material. Table 800 illustrates parameters that may be set in a selective sintering machine such as, for example, 3D Systems 2500CI Selective Sintering Machine. However, some modifications may be required to safely obtain and maintain the required processing temperatures.

When powder material 400 takes the form of nylon 66, the bed in the selective laser sintering machine may be heated to a temperature from around 190 degrees Celsius to around 260 degrees Celsius. The energy source should provide sufficient heat to increase the temperature above the melting point of the material from around 197 degrees Celsius to 265 degrees Celsius.

With reference now to FIG. 9, a diagram of a table of parameters for setting a selective sintering machine is depicted in accordance with an advantageous embodiment. Table 900 provides an example of parameters for settings in a selective sintering machine such as, for example, 3D Systems SLS Machine, as previously described.

These parameters are ones that may be used when powder material 400 takes the form of polyphenylene sulfide for use in manufacturing parts. When powder material 400 takes the form of polyphenylene sulfide, the powder in the bed may be heated from around 240 degrees Celsius to around 282 degrees Celsius. The energy applied may heat the temperature of the material above the melting point to a temperature of around 280 degrees Celsius to around 285 degrees Celsius.

With reference now to FIG. 10, a table illustrating parameters for setting a selective laser sintering system is depicted in accordance with an advantageous embodiment. Table 1000 provides an example of parameters that may be set in a selective laser sintering machine, such as 3D Systems SLS Machine. The parameters in table 1000 may be used when powder material 400 takes the form of polyetherketoneketone.

With reference now to FIG. 11, a table illustrating mechanical properties for polymers that may be used is depicted in accordance with an advantageous embodiment. These mechanical properties are polymers that may be processed using selective laser sintering. In this example, table 1100 illustrates ultimate tensile tile strength, offset yield strength, elongation percentage, and melting point temperatures for a number of materials in comparison with some currently known materials.

In these examples, entries 1102, 1104, and 1106 are entries for materials selected in accordance with an advantageous embodiment. Entries 1108 and 1110 represent materials currently used for comparison purposes. Entry 1102 is for polyetherketoneketone, entry 1104 is for polyphenylene sulfide, and entry 1106 is for nylon 66. Entry 1108 is for nylon 12, while entry 1110 is for nylon 11.

As can be seen, the melting points for polyetherketoneketone, polyphenylene sulfide, and nylon 66 are significantly higher as compared to nylon 12 and nylon 11. Nylon 12 has a melting point temperature of around 187 degrees Celsius, while nylon 11 has a melting point temperature of around 186 degrees Celsius. Nylon 66 has a melting temperature of around 254 degrees Celsius, polyphenylene sulfide has a melting point of around 280 degrees Celsius, and polyetherketoneketone has a melting point of around 310 degrees Celsius. In addition to having higher melting points, these different materials also may have the desired mechanical properties for constructing aircraft parts.

Figure 12:
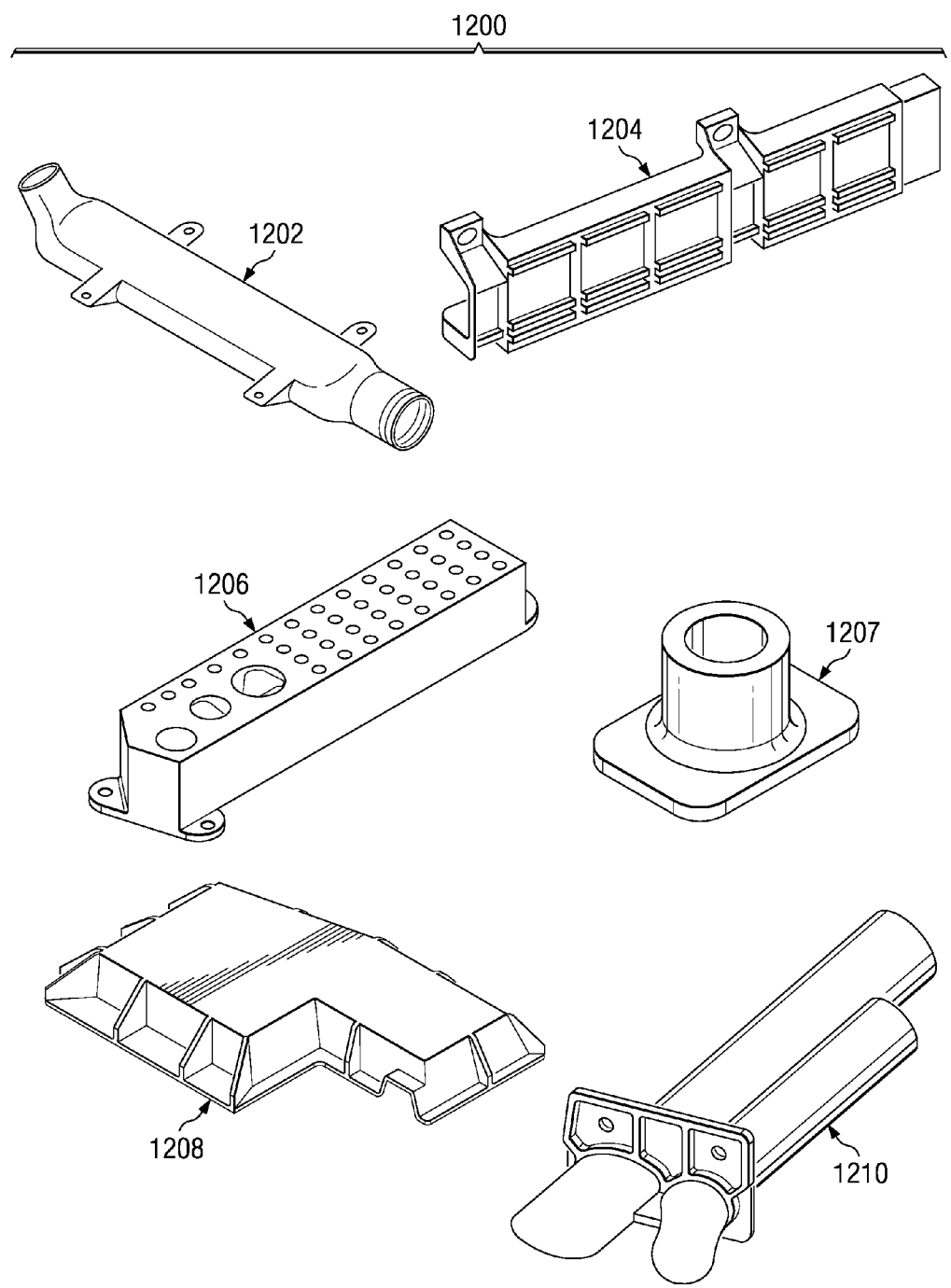
FIG. 12 is a diagram illustrating parts that may be manufactured using polymers in accordance with an advantageous embodiment.

With reference now to FIG. 12, a diagram illustrating parts that may be manufactured using polymers is depicted in accordance with an advantageous embodiment. In these examples, parts 1200 are example parts that may be manufactured using powder material 400 in FIG. 4. Parts 1200 include duct 1202, electrical shroud 1204, power distribution panel 1206, fitting 1207, closure 1208, conduit 1210, and other suitable aircraft parts. Many other types of parts, other than these illustrative ones, may be manufactured using polymers and powder materials for selective laser sintering processes in accordance with an advantageous embodiment.

With reference now to FIG. 13, a flowchart of a process for manufacturing parts is depicted in accordance with an advantageous embodiment. The process illustrated in FIG. 13 may be implemented in a manufacturing environment such as, for example, manufacturing environment 300 in FIG. 3. In these illustrative examples, the process may begin by selecting a powder material that is comprised of a polymer that is semi-crystalline, has an overlap between a melting temperature range and a re-crystallization temperature range, has a particle size distribution that is substantially a Gaussian distribution, a particle shape that is substantially spherical, and has a desired melt flow rate that is less than a temperature at which the powder material begins to chemically break down (operation 1300).

A polymer chemically breaks down when the polymer is heated, such that the chains in the polymer begin to fall apart. In particular, a long chain that is a high-strength chain in the polymer may fall apart into subscale chains called monomers. The chemical breakdown also may result in the polymer breaking down into constituent components and molecules. In other words, the polymer chemically breaks down when the structure of the polymer begins to fall apart. The process then manufactures the part using an energy delivery system and the selected powder material (operation 1302), with the process terminating thereafter.

With reference now to FIG. 14, a flowchart of a process for processing a polymer for use as a powder material is depicted in accordance with an advantageous embodiment. In these examples, the process illustrated in FIG. 14 may be used to manufacture a powder material such as, for example, powder material 316 for use in manufacturing part 304 in manufacturing environment 300 in FIG. 3.

The process may begin by performing a cryo-grinding operation on pellets or other forms of the selected polymer (operation 1400). In these illustrative examples, cryo-grinding may be performed by cooling the polymer stock to cryogenic temperatures to induce fracture rather than tearing of the material. The cryo-grinding operation may be performed to fracture the material in a manner that prevents heat generation and building of molecular weight within the polymer.

This polymer stock may take various forms. For example, the polymer stock may be in the form of pellets, beads, strips, or some other suitable form. The grinding operation is set to produce a general shape and size. The resulting particles may be either air or screen classified to obtain the correct particle distribution. Particles that are larger than the accepted range are removed, cooled, and reground. The particles that are too small for the specified particle range are removed and discarded.

The particles are then thermally shaped (operation 1402). Operation 1402 may be performed by passing heated air through a column or a bed of powder at a temperature such that the particles may become spherodized by contact. The process terminates thereafter.

Figure 15:
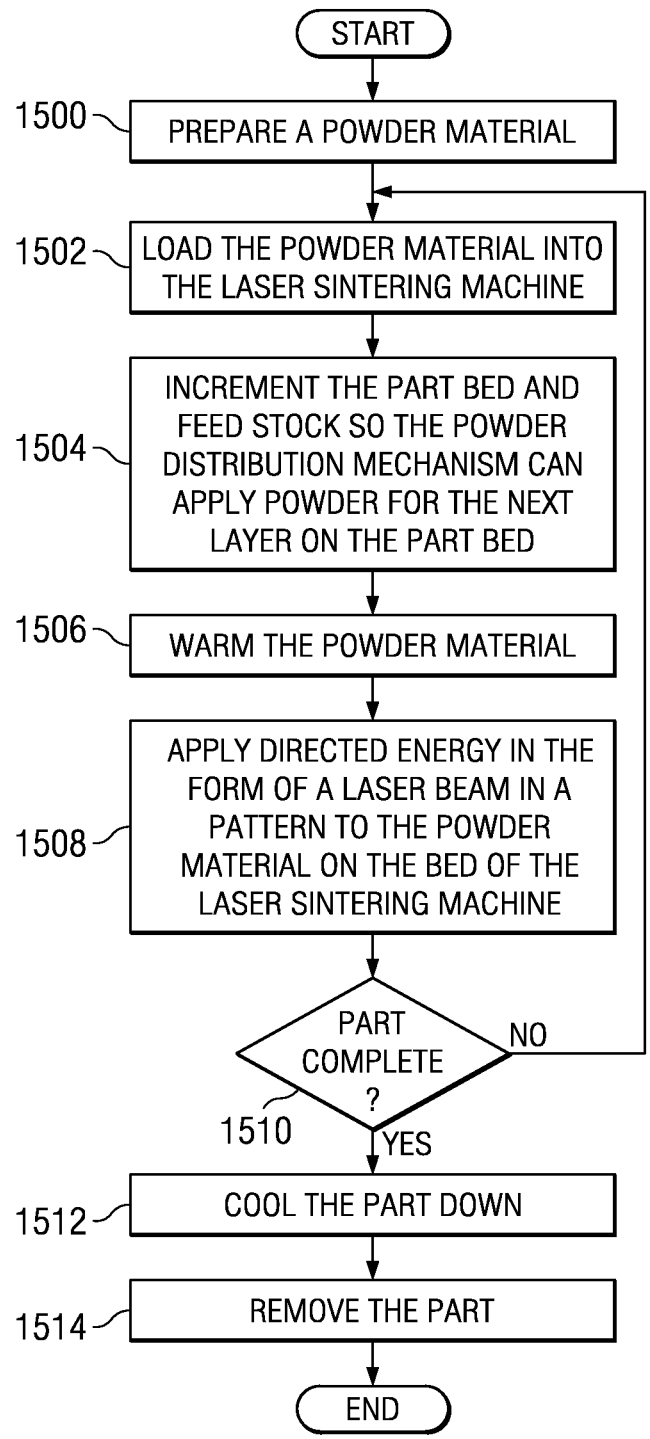
FIG. 15 is a flowchart of a process for manufacturing a part in accordance with an advantageous embodiment.

With reference now to FIG. 15, a flowchart of a process for manufacturing a part is depicted in accordance with an advantageous embodiment. The process illustrated in FIG. 15 may be implemented in manufacturing environment 300 in FIG. 3. The process begins by preparing a powder material (operation 1500). The process loads the powder material into the laser sintering machine (operation 1502). The process then increments the part bed and the powder in feed stock to allow the powder distribution mechanism to apply powder for the next layer on the part bed (operation 1504).

The process may then warm the powder material (operation 1506). The warming of the powder material may occur prior to the powder being placed onto the bed of the laser sintering machine. The warming of the powder material may continue while the powder material is on the bed of the laser sintering machine. In other words, the powder material may be pre-warmed. In other advantageous embodiments, the powder material may not be warmed until placed onto the bed in the laser sintering machine.

Directed energy in the form of a laser beam may be applied in a pattern to the powder material on the bed (operation 1508). The application of the laser beam in a pattern onto the powder material may melt and/or sinter the powder material into a liquid and/or molten form. This processing of the powder material may form at least a portion of the part.

A determination may be made as to whether the part is complete (operation 1510). In some cases, the part may require a single pass of the laser beam. In other advantageous embodiments, additional passes may be required to complete the part, depending on the geometry and size of the part. If the part is not complete, the process returns to operation 1502 as described above.

If the part is complete, the process then cools the part down (operation 1512), the part is removed (operation 1514), with the process terminating thereafter.

The flowcharts and block diagrams in the different depicted embodiments illustrate the architecture, functionality, and operation of some possible implementations of apparatus and methods for manufacturing parts, objects, and/or products. In this regard, each block in the flowchart or block diagrams may represent a module, segment, step, operation, or a portion thereof for implementing a specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments may provide a method and apparatus for manufacturing parts. At least some of the different advantageous embodiments may provide a capability to manufacture parts having a capability to operate at higher temperatures and/or lighter weight than currently available parts manufactured using a directed energy system. In the different advantageous embodiments, polymers may be selected having one or more characteristics providing a capability to manufacture a part using a directed energy system, such as a laser beam in a laser sintering machine. Further, the part also may have the desired mechanical characteristics that may be maintained during use of the part.

The different advantageous embodiments may be especially useful with manufacturing parts for use in aircraft. As discussed above, the different advantageous embodiments may provide parts capable of operating at temperatures above around 100 degrees Celsius to around 280 degrees Celsius. Further, although the different illustrative examples may be used to create parts for these temperatures, one or more of the different advantageous embodiments also may be used to create parts for other temperature ranges.

In this manner, by selecting polymer characteristics and manufacturing polymers with the identified characteristics, the different advantageous embodiments may use these selectively laser sintered polymers in place of metals that may normally be used for parts used at temperatures of around 200 degrees Celsius and above.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to parts for an aircraft, other advantageous embodiments may be applied to parts for other types of objects.

For example, without limitation, other advantageous embodiments may be applied to a mobile platform, a stationary platform, a land-based structure, an aquatic-based structure, a space-based structure, and/or some other suitable object.

More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing parts, the method comprising:
    selecting a powder material that is comprised of a polymer that is a semi-crystalline, has an overlap between a melting temperature range and a crystallization temperature range, has a particle size distribution that is substantially a Gaussian distribution, has a particle shape that is substantially spherical, and has a desired melt flow rate that occurs at a temperature below a temperature at which the powder material begins to chemically break down to form a selected powder material; and
    manufacturing a part using an energy delivery system and the selected powder material.

2. The method of claim 1, wherein the manufacturing step comprises:
    delivering energy in stages to the powder material at specified points in space at a level sufficient to manufacture the part.

3. The method of claim 1, wherein the manufacturing step comprises:
    directing a laser beam to the powder material at specified points in space at a level sufficient to manufacture a part.

4. The method of claim 3, wherein the directing step is performed using a selective laser sintering process.

5. The method of claim 3 further comprising:
    heating a bed surface on which the powder material is heated from at least 220 degrees to around 330 degrees Celsius.

6. The method of claim 1, wherein the manufacturing step comprises:
    loading the powder material onto a bed in a chamber of a laser sintering machine;
    warming the powder material;
    directing a laser beam onto the powder material on the bed; and
    repeating the loading, warming, and directing steps until the part is complete.

7. The method of claim 1, wherein the part is manufactured in an environment in which an oxygen level is less than around one percent.

8. The method of claim 1, wherein the part is manufactured in an environment in which a thermal gradient of less than around 10 degrees Celsius per inch is present in a location where the part is manufactured.

9. The method of claim 1, further comprising:
    heating a bed surface on which the powder material is heated from at least 220 degrees to around 330 degrees Celsius, wherein the part is manufactured in an environment in which an oxygen level is less than around one percent, and wherein the part is manufactured in an environment in which a thermal gradient of less than around 10 degrees Celsius per inch is present on the bed surface.

10. The method of claim 1, wherein the particle size distribution is from around 20 micrometers to around 130 micrometers with an average particle size between around 50 micrometers to around 80 micrometers.

11. The method of claim 1, wherein the desired melt flow rate that can be achieved is around 15 grams/10 minutes to around 40 grams/10 minutes.

12. The method of claim 1 further comprising:
    grinding a polymer material to fracture the polymer material into the particle size distribution at a temperature that avoids heat generation that builds molecular weight.

13. The method of claim 12, wherein the grinding step is performed using cryo-grinding.

14. The method of claim 12 further comprising:
    heating the polymer material after the grinding step to form the particle shape that is substantially spherical in shape.

15. The method of claim 1, wherein the polymer is selected from one of nylon 66, a polyphenylene sulfide, a polyetherketoneketone, a nylon 66 blend, a polyphenylene sulfide blend, and a polyetherketoneketone blend.

16. The method of claim 1, wherein the part is for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

17. The method of claim 1, wherein the powder material further comprises a blend of a polymer with at least one addition of glass beads, hollow glass spheres, glass fibers, carbon fibers, other polymers, minerals, clays, flame-retardant additives, and color additives.

18. The method of claim 1, wherein the melt flow rate comprises a rate at which the powder material, when melting or when in liquid form, flows and does not bead up.

19. The method of claim 1, wherein the melt flow rate is non-zero.

20. A method for manufacturing parts, the method comprising:
    selecting a powder material that is comprised of a polymer that is semi-crystalline, is capable of entering a liquid state and a crystalline state within an overlapping range of temperatures, has a particle size distribution capable of allowing particles to flow through openings formed by larger particles in the particle size distribution, has a particle shape that is substantially spherical, and has a desired melt flow rate that occurs at a temperature below a temperature at which the powder material begins to chemically break down to form a selected powder material; and manufacturing a part with the selected powder material using an energy delivery system.

21. The method of claim 20, wherein the manufacturing step comprises:
loading the powder material onto a bed in a chamber of a manufacturing apparatus;
warming the powder material;
directing a laser beam onto the powder material on the bed; and
repeating the loading, warming, and directing steps until the part is complete.

22. The method of claim 20, wherein the polymer is selected from one of nylon 66, a polyphenylene sulfide, a polyetherketoneketone, a nylon 66 blend, a polyphenylene sulfide blend, and a polyetherketoneketone blend.

23. The method of claim 20, wherein the part is for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

24. The method of claim 20, wherein the melt flow rate comprises a rate at which the powder material, when melting or when in liquid form, flows and does not bead up.

25. The method of claim 20, wherein the melt flow rate is non-zero.

\* \* \* \* \*